May 8, 1962   E. F. OBERT ET AL   3,032,776
WASTE DISPOSAL METHOD AND MEANS
Filed April 18, 1958   2 Sheets-Sheet 1

INVENTORS
Edward F. Obert
John A. Logan
BY
Ooms, McDougall, Williams & Hersh
Attorneys May 8, 1962  E. F. OBERT ET AL  3,032,776
WASTE DISPOSAL METHOD AND MEANS
Filed April 18, 1958  2 Sheets-Sheet 2
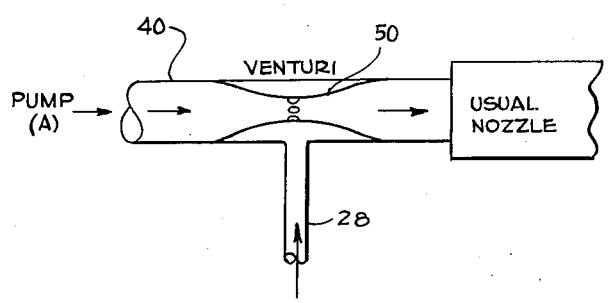
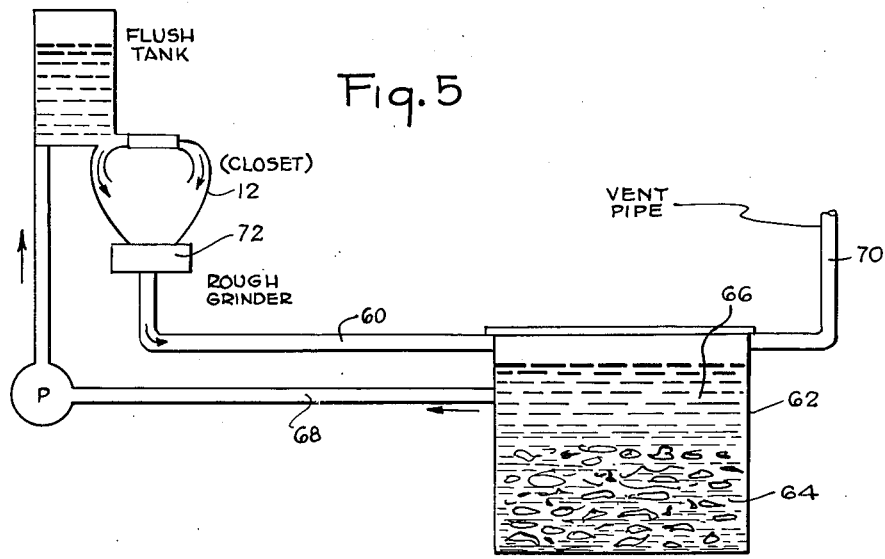
INVENTORS
Edward F. Obert
John A. Logan
BY
Ooms, McDougall, Williams & Hersh
Attorneys United States Patent Office 3,032,776
Patented May 8, 1962

3,032,776
WASTE DISPOSAL METHOD AND MEANS
Edward F. Obert, 1204 Noyes St., and John A. Logan, 824 Ingleside Ave., both of Evanston, Ill.
Filed Apr. 18, 1958, Ser. No. 729,403
16 Claims. (Cl. 4—1)

This invention relates to the disposal of organic or other waste matter, and it relates more particularly to a means and method for the disposal of fecal matter and the like sewage or waste material.

To the present, the great majority of the systems for the disposal of waste make use of water as a flushing agent to carry away the waste for subsequent disposition. For the most part, such sewage that is flushed away with the water is carried to aeration areas for the material decomposition thereof. In other systems, the waste is processed in tanks for accelerating bacterial action by which the waste is broken down into products suitable for use as fertilizer or the like, as represented by composting processes. In another system for waste disposal, the waste is carried to furnaces and burned but not before it is subjected to an extensive drying operation to effect the removal of the large amounts of water present and to reduce the waste to a burnable state. Even then, the addition of heat or a fuel is required to effect the desired combustion.

Since sewage or waste disposal systems as make use of large amounts of water are quite satisfactory where water is plentiful and where the water can be maintained in a condition of ready availability for use. Certain difficulties arise in the use of water closets or in the use of water as flushing agents or carriers where large amounts of water are not readily available, as in arid regions or in mobile units, such as aircraft, trailers, construction units and the like.

Other difficulties arise where the temperature conditions are such as to cause the water to become frozen either in the flush tank or in the passages through which the waste is carried for disposal. Under such circumstances, it has been necessary to provide heating means for maintaining the water in a fluid state and to provide additional insulation for protecting the passages communicating the flush-tank with the disposal unit. Such additional devices operate markedly to increase the cost of equipment, the cost of installation, and maintenance of the equipment, and still the dangers of breakdown are always present in the event of failure of operation or in the event of extreme or unexpectedly low temperature conditions.

Thus, it is an object of this invention to provide a new and improved sanitation system which obviates many of the problems heretofore described, and it is a related object to produce apparatus and means for the use in the practice of same.

More specifically, it is an object of this invention to provide a means for the disposal of waste, such as fecal matter; which is capable of safe and continuous operation independently of ambient temperature or atmosphere; which is not subject to the limitations inherent in the use of water as a flushing agent or carrier; which makes use of low cost and readily available materials; which is simple and efficient in operation; which provides for the handling of waste under safe and sanitary conditions; which derives value from the waste thereby to enhance the economics of the waste disposal system, and which can be adapted for use under conditions where water is not practical as in arid regions, mobile units, and where temperature remains below freezing over extended periods of time.

These and other objects and advantages of this invention will hereinafter appear and for purposes of illustration, but not of limitation, an embodiment of the invention is shown in the accompanying drawings, in which—

FIGURE 4 is a diagrammatic view illustrating a further modification which may be employed in the assemblies of FIGURES 1 and 2; and FIGURE 5 is a diagrammatic view of a still further system which may be employed in the practice of this invention.

Figure 1:
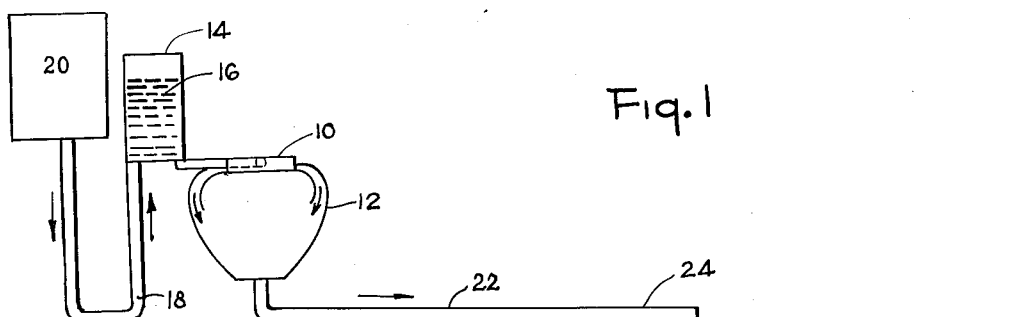
FIGURE 1 is a schematic view of the arrangement of parts which may be employed in the practice of this invention.
Figure 2:
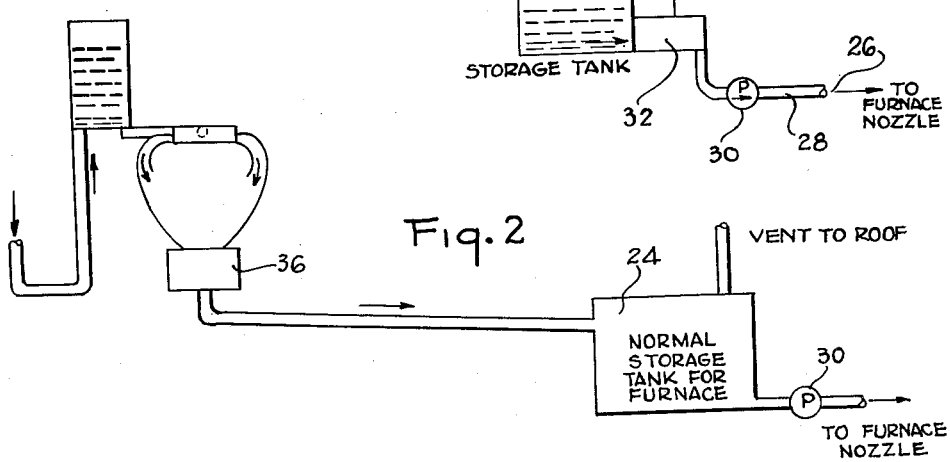
FIGURE 2 is a schematic view similar to that of FIGURE 1 showing a modification in the system which may be employed in the practice of this invention.

The concepts of this invention will hereinafter be described with reference to a new and improved sanitation system as related to the disposal of fecal matter. The latter is considered to present the greatest problems of disposal for most people in most sections of the country or of the world, and its problems of disposal will be found to exist under all of the widely varying conditions as heretofore described, and especially under frigid conditions where the forces of nature are slow to the extent that breakdown by bacterial action becomes unsatisfactory because of the long time of exposure that would be required. It will be understood that many of the concepts which will hereinafter be described will be capable of use as a disposal means for other waste and organic matter where the problems stemming from the scarcity of water, mobility of a unit, and frigid conditions exist.

In accordance with the practice of this invention, the problems heretofore encountered in the safe and sanitary disposal of fecal matter are overcome by a system in which the fecal matter is flushed and carried away from the closet or toilet by a liquid component having a pour point or freezing point which is below the minimum temperature capable of existing under the conditions of use, and which is further preferably characterized by good combustibility coupled with a low flash point and little, if any, odor, or which has a specific gravity differing from that of the waste and preferably having a lower specific gravity to enable separation by decantation for the recovery of the liquid for reuse, or which may embody the combination of combustibility and specific gravity along with the ability to dissolve the fecal matter or other waste for disposal of the liquid and waste by combustion or the like.

In the preferred concept of this invention, use is made of a system wherein the liquid used for flushing the fecal matter and as a carrier comprises a material capable of use as a fuel for combustion in the generation of heat and/or power. Thus, value can be derived from the liquid other than in its use as a flushing agent and carrier, and the liquid can serve simultaneously as a means for supporting the combustion of the organic matter or waste to provide for the complete and sanitary disposal thereof. The ability to burn the fecal matter or waste in combination with the combustible fluid enables utilization to be made of the waste as a fuel supplement to the liquid in the generation of heat and power, thereby to derive an economic benefit from the waste while at the same time achieving a satisfactory means for the disposal thereof. Fecal matter and waste has previously been disposed of by burning, but in the practices heretofore employed, it has been necessary to drive off the large amounts of water present as a carrier and to provide additional means for support of combustion. These latter steps add materially to the cost of operation and are justified only where disposal by other means is objectionable for various reasons.

On the other hand, in the described system embodying the preferred concepts of this invention, the fecal matter and waste is not diluted with non-combustible materials which must be driven off prior to burning, and the carrier liquid in itself operates as a means for igniting the waste and to support combustion thereof. As a result, a simple and efficient system is provided which is capable of operation under all conditions and which enables the carrier fluids to be used in a manner normally intended so that cost of materials will not enter into the economics of the disposal system, thereby to make the special liquids described almost as inexpensive as water in the use to be made. In addition, the value of the liquid is sometimes supplemented (when the aqueous component of the waste is low) by the waste material which it picks up, thereby, in a sense, to increase the value of the liquid without increase in cost, while at the same time accomplishing an essential service in the sanitary disposal of waste.

As the liquid, it is desirable to make use of a fluid embodying the characteristics of the type previously described having a low freezing or pour point and which is substantially odorless. From a practical standpoint, the material should be low cost and readily available. These characteristics can best be met by a fluid which is capable of use as a fuel for the generation of heat and power by combustion, as represented by fuel oil. The latter may have a freezing point in the order of −70° F., which is far below the lowest temperature normally encountered in the Arctic regions. As a result, it will remain liquid under all conditions of use. It is widely used as a fuel for the generation of heat and power, and it will support combustion of other organic material without presenting excessive dangers of inadvertent combustion in and of itself since it has a relatively low flash point and can generally be extinguished merely by covering the toilet seat or by flushing in the event of inadvertent ignition by a match, cigarette, or the like. Further, fuel oil is a low cost material which is widely used in amounts necessary to be employed for the removal of waste and it is therefore readily available in amounts for such use. Instead of fuel oil, use can be made of kerosene and other petroleum and cold tar hydrocarbons, such as toluol, xylol, mineral spirits, naphtha, pentanes, hexanes and the like, and mixtures thereof, or organic liquids and solvents such as the heavier alcohols, esters, ethers and the like, as represented by isopropyl alcohol, octyl alcohol, butanol, and the like.

It will be understood that disposal by combustion can be achieved without the recovery of heat for the generation of power or for space heating. Under such circumstances, use can be made of other readily available low cost combustible materials for flushing and carrying away the fecal matter so long as the material has the desired low freezing point and is capable of combustion, and so long as the material is preferably characterized by a low flash point and little, if any, odor.

Having described the broad concepts of this invention, reference will now be made to the drawings for a more specific discussion of the inventive concepts as related to a representative system for carrying them out. The arrangement of elements employed in the preferred practice of this invention is shown in FIGURE 1 wherein the numeral 10 represents the conventional toilet seat arranged over a bowl or closet 12 with a flush tank 14 at a higher level than the bowl for the drainage of a fluid 16 from the tank to the bowl in response to manual operation to open a valve in a line communicating the tank with the bowl.

A line 18 connects the flush tank 14 with a reservoir 20 or other supply of the liquid. The flush tank is supplied with the conventional type of float valve and release mechanism for emptying the fluid into the bowl, and the line 18 is supplied with a suitable valve and pump means for causing liquid to flow from the reservoir to the flush tank for filling to the desired level. Much less fluid than is required for a water closet can be used for flushing the fecal matter from the bowl, but the amount is unimportant where use is to be made of the liquid as a fuel or where the liquid is to be recovered for recycling or reuse in the system.

In the modification illustrated in FIGURE 1, the fecal matter flushed from the bowl by the liquid is drained through passage 22 to a storage tank 24 wherein the materials can be housed to function as a source of supply of liquid fuel for burners 26. The piping through which the liquid and fecal matter are drained should preferably be formed of steel, copper or the like metal pipe since leakage through the joints would occur more easily in the conventional type of interfitting ceramic conduits.

The burners 26 may be arranged in a furnace for space heating or in a furnace in which the liquid fuel is burned for the generation of power. In either instance, the feed pipe 28 to the burners would be provided with the usual mixing valves for enabling the admixture of air or oxygen in combination with the fuel oil or other combustible liquid for burning. Burners and furnaces capable of use are well known to the art such that detailed description thereof need not be given here.

Prior to the feed of the liquid to the burners, as by means of a pump 30, the material in the storage tank is adapted to be disintegrated by means of a grinder and blender 32 to reduce the mixture to a fluid system capable of being fed through the pipes 28 to the burners 26 for combustion. Instead of calling for continuous operation of the grinder and blender, it is more desirable to provide for intermittent operation either in response to the call upon the unit for feeding the burners during intermittent burning, as in regular fuel oil systems for space heating, or use can be made of a grinder and blender which is responsive to a float member 34 to cause an increment of the material to be ground and blended when the level in the tank reaches a predetermined maximum and until an amount is ground down to reduce the level to a predetermined minimum.

Instead of draining the liquid-fecal matter through the pipe 22 to the housing 24 for storage until used, the system can make use of a grinder and blender 36 in direct communication with the closet for reducing the material to a homogenized state prior to disposition in a day tank 24 for storage. Under such circumstances, the initial grinder and blender in communication with the closet would operate in response to operation of the flush tank to disintegrate the matter upon delivery from the closet. Normally, the material could be fed directly from the day tank to the burners of the furnace for combustion, or the material could be processed through an additional fine grinder and blender, as illustrated by the numeral 32, prior to feeding the burners by the displacement pump 30.

Figure 3:
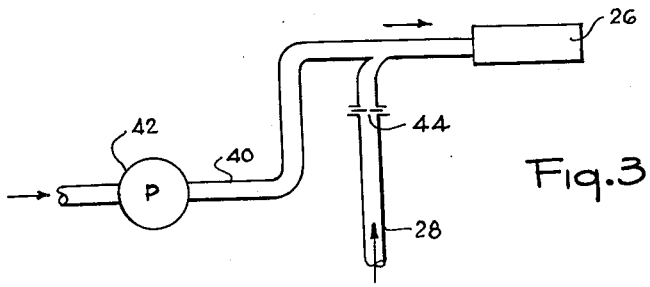
FIGURE 3 is a diagrammatic view illustrating a modification which may be employed in the assemblies of FIGURES 1 and 2.

Very often, the amount of liquid employed for sewage disposal forms only a fraction of the amount of liquid burned for the generation of heat and/or power. Where additional amounts of fuel are required, it is desirable to achieve a relatively unform blend of the liquid fuel and the carrier liquid to the burners to minimize vapors in the feed. Thus, the feed pipe 28 from the blender will be arranged as a branch pipe to the main fuel line 40, as illustrated in FIGURE 3 of the drawings. The latter is provided with the usual pump 42 and controls for regulating the feed to the burners 26. The branch line 28 is simultaneously provided with a metering means 44 for proportioning the flow through the branch line in response to the flow of liquid fuel through the main feed line. Simultaneous flow in the proportioned amount can be effected by causing the feed pump 30 to operate in response to operation of the main feed pump 42. In the alternative, as illustrated in FIGURE 4, a venturi 50 can be provided in the main feed line 40 for communication with the branch line 28 to draw a controlled amount of material from the branch line in response to the flow of liquid fuel through the main feed line and in proportion thereto. Other conventional proportioning means well known to the art can be employed for relating the ratios between the blend liquid and the main liquid fuel. Instead, a continuous flush system may be employed and the liquid can be used for constant or intermittent feed of the burners or else recycled for flushing purposes.

As previously pointed out, the flushed material need not be burned as a fuel. The material can be led away to an area where the liquid can support combustion for burning the fecal matter or the sewage with or without pregrinding to effect substantially complete and immediate disposal thereof.

Instead, where the liquid is a non-solvent for the waste, and where the liquid differs from the waste from the standpoint of specific gravity, the liquid and the flushed waste can be led from the bowl 12 through the passage 60 to a settling tank 62. In the settling tank, the solids 64 or other material of higher specific gravity will settle to the bottom for removal through a trap while the liquid 66 separates out as a layer on the top. The separated liquid can be siphoned off through the line 68 for return of the liquid to the flush tank or reservoir for reuse.

Where the liquid is of higher specific gravity than the waste, the latter will migrate to the top of the settling tank to enable separation while the liquid will form the layer at the bottom for siphoning off for reuse. It is more desirable to make use of a system embodying a liquid of lower specific gravity so that the liquid will provide a continuous protective layer which blocks the escape of fumes from the housings.

As in the burner systems, the settling or storage tank should be provided with a vent pipe 70 for the removal of vapors which might be generated in the system. The material ground from the closet or bowl may be ground and blended by the unit 72 prior to conveyance to the settling tanks. Such reduction will assist in the separation and removal of the various phases.

In the aforementioned systems, the necessity for grinding and for blending is minimized if use is made of an organic liquid in which the waste material is capable of being dissolved in whole or in part. Best use would call for a grinder in combination with a liquid capable of solvation of the materials. In this connection it is a concept of this invention to make use of a dispersing or surface-active agent as an additive with the liquid to enable more immediate and complete subdivision of the organic waste in the liquid.

The described systems for waste disposal can be employed also for the disposal of refuse, garbage and other organic waste material capable of combustion when supported by the presence of a highly combustible liquid in combination therewith.

It will be apparent from the foregoing that a number of important technological improvements are embodied in the concepts described for the disposal of waste.

(1) The waste and its liquid flushing agent carrier can be used as a fuel mixture in a furnace to provide heat derived not only from the liquid fuel carrier but also from the waste material contained therein, thereby to increase the heat value of the liquid while at the same time providing a sanitary means for disposing of waste without limitation as to the envirnomental conditions which obviate the use of water or the like material as a flushing agent and carrier.

(2) Since the combustible liquid can be used for the purpose for which it might originally have been intended, as a fuel or the like, use of the liquid for flushing and as a carrier does not operate as a barrier to the adoption of the more costly liquid in the manner described for the disposal of waste.

(3) The use of a flushing and carrier liquid having a low freezing point enables the system to be employed under temperature conditions which would militate against the use of water closets for flushing and carrying away fecal matter or other waste. Thus the dangers of freezing or failure of the waste disposal system and the necessity to heat and insulate the sewage lines can be completely avoided, thereby to make the system desirable in military or civilian establishments in Alaska or other Arctic regions.

(4) Use of a liquid of low specific gravity will enable the liquid to separate and form a layer overlying the sewage or waste thereby to block the release of objectionable odors from the disposal system. Further, the liquid in itself may have an agreeable odor of its own which will mask any undesirable odors coming from the system, and later can be vented, as described, to carry off such odors as might escape.

(5) The system described can be modified to receive other sewage or waste in addition to the fecal matter for disposal therewith. Such additional waste can be introduced into the liquid subsequent to drainage from the closet, as by providing inlet means in the day tank or storage tank into which the liquid is drained. Thus the additional material can be introduced into the liquid prior to feeding the burners, but preferably before grinding down and blending.

It will be understood that various changes may be made in the construction and operation of the system without departing from the spirit of the invention, especially as defined in the following claims.

We claim:

1. In a toilet system, the method for the removal and disposal of fecal matter from the toilet comprising the steps of flushing the fecal matter from the toilet with an organic liquid carrier that is capable of combustion, draining the fecal matter and liquid to another station, and then burning the liquid with the fecal matter for substantially complete disposition thereof.

2. In a toilet system, the method for the removal and disposal of organic waste from the toilet comprising the steps of flushing the waste from the toilet with an organic liquid carrier characterized by combustibility and a low freezing point, removing the waste and liquid to another station, and burning the liquid and waste for substantially complete disposition thereof.

3. In a toilet system, the method for the removal and disposal of organic waste from the toilet comprising the steps of flushing the waste from the toilet with a combustible organic liquid carrier having a low freezing and high flash point, removing the liquid and waste to another station, and burning the liquid with the waste for substantially complete disposition thereof.

4. In a toilet system, the method for the removal and disposal of organic waste from the toilet comprising the steps of flushing the waste from the toilet with a combustible organic liquid carrier, removing the waste and liquid to a distant station, burning the liquid with the waste for the substantially complete disposition thereof, and recovering the heat from the burning liquid and waste for use in space heating and in the generation of power.

5. In a sanitation system, the method for the removal and disposal of organic waste from the toilet comprising the steps of flushing the waste from the toilet with an organic liquid carrier which is capable of combustion as a fuel, feeding the liquid and waste to burners, and burning the liquid and waste to recover the heat content of the material for use in space heating and in the generation of power.

6. The method as claimed in claim 5 which includes the step of grinding and blending the waste with the liquid prior to feeding to the burners.

7. The method as claimed in claim 5 which includes the step of admixing the waste and liquid with a separate increment of the liquid fuel for feeding to the burners.

8. The method as claimed in claim 5 which includes the step of venting the mixture of waste and liquid for the removal of undesirable fumes.

9. A sanitary disposal system for fecal matter comprising a closet, a flush tank in communication with the closet, a source of supply of an organic liquid carrier having a low freezing and high flash point, a means communicating the source of supply with the flush tank for introducing an increment of liquid into the flush tank for flushing the waste from the closet, a burner and means communicating the closet with the burner for feeding the liquid and waste from the closet to the burner.

10. A sanitary disposal system as claimed in claim 9 which includes a means intermediate the closet and burner for grinding and blending the waste with the liquid prior to feeding to the burner.

11. A sanitary disposal system as claimed in claim 9 which includes a pump means in the means communicating the closet with the burner for feeding the material under pressure to the burner.

12. A sanitary disposal system as claimed in claim 9 which includes a storage means intermediate the closet and burner for retaining the liquid and waste until required for the burner.

13. A sanitary disposal system as claimed in claim 12 which includes a grinder and blender in communication with the closet for reducing the material upon drainage from the closet.

14. A sanitary disposal system as claimed in claim 9 which includes a main line for feeding liquid fuel to the burner and in which the means communicating the closet with the burner communicates with the main feed line to the burner and which includes a proportioning means for proportioning the amount of liquid and waste blended with the liquid fuel in the main feed line.

15. In a waste disposal system, a method for removing and disposing of waste from a container holding the same comprising the steps of flushing the waste with an organic liquid which is capable of combustion, draining the mixture consisting of the waste and organic liquid to another station and then burning the said mixture for substantially complete disposition thereof.

16. In a waste disposal system, a method for removing and disposing of waste from a container holding the same comprising the steps of flushing the waste with an organic liquid having a low freezing point and a high flash point, draining the mixture consisting of the waste and organic liquid to another station and then burning the said mixture for substantially complete disposition thereof.

References Cited in the file of this patent

UNITED STATES PATENTS

| | | |
|---|---|---|
| 1,075,471 | Foster | Oct. 14, 1913 |
| 2,029,725 | Kuhner | Feb. 4, 1936 |
| 2,094,909 | Baily et al. | Oct. 5, 1937 |
| 2,103,828 | Seip | Dec. 28, 1937 |
| 2,118,157 | Camp | May 24, 1938 |
| 2,584,805 | Leftwich | Feb. 5, 1952 |
| 2,724,837 | McPherson | Nov. 29, 1955 |
| 2,732,564 | Potts | Jan. 31, 1956 |
| 2,740,971 | Weekes | Apr. 10, 1956 |
| 2,768,386 | Graef et al. | Oct. 30, 1956 |
| 2,798,227 | Boester | July 9, 1957 |
| 2,835,215 | Harm | May 20, 1958 |